(12) United States Patent
Li (10) Patent No.: US 10,528,784 B2
(45) Date of Patent: Jan. 7, 2020

(54) CIRCUIT AND METHOD FOR SIGNAL PROCESSING IN FINGERPRINT SENSOR

(71) Applicant: Chipone Technology (Beijing) Co., Ltd., Beijing (CN)

(72) Inventor: Zhuo Li, Beijing (CN)

(73) Assignee: Chipone Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 15/579,701

(22) PCT Filed: Dec. 30, 2016

(86) PCT No.: PCT/CN2016/113375
§ 371 (c)(1),
(2) Date: Dec. 5, 2017

(87) PCT Pub. No.: WO2017/143863
PCT Pub. Date: Aug. 31, 2017

(65) Prior Publication Data
US 2018/0357456 A1 Dec. 13, 2018

(30) Foreign Application Priority Data

Feb. 23, 2016 (CN) .......................... 2016 1 0099601

(51) Int. Cl.
*G06K 9/00* (2006.01)
(52) U.S. Cl.
CPC ....... *G06K 9/0002* (2013.01); *G06K 9/00087* (2013.01)

(58) Field of Classification Search
CPC .... G06K 9/0002; G06K 9/00087; G06K 9/40; G06K 9/00013
USPC ........................................................ 382/124
See application file for complete search history.

(56) References Cited

U.S. PATENT DOCUMENTS

| | | | |
|---|---|---|---|
| 2013/0293511 A1* | 11/2013 | Nam ....................... | G06F 3/044 345/174 |
| 2015/0324061 A1* | 11/2015 | Shen ..................... | G06F 3/0418 345/174 |
| 2016/0232394 A1* | 8/2016 | Riedijk ................... | G06F 3/044 |
| 2017/0147860 A1* | 5/2017 | Yang ........................ | G06K 9/00 |
| 2017/0177934 A1* | 6/2017 | Ran .................... | G06K 9/00013 |

(Continued)

*Primary Examiner* — Van D Huynh
(74) *Attorney, Agent, or Firm* — JW Law Group; James M. Wu (57) ABSTRACT

Disclosed is a circuit and a method for signal processing in a fingerprint sensor. The fingerprint sensor comprises sensing elements configured to generate a sensing signal in responsive to a finger-touch action. The circuit for signal processing comprises: a biasing circuit for generating a biasing signal; an amplifier for generating an analog output signal according to the sensing signal; and an analog-to-digital converter for converting the analog output signal into a digital output signal. In the noise detection mode, the amplifier is configured to amplify a superposed signal of the sensing signal and the biasing signal to generate a first analog output signal, and the operating frequency of the amplifier is adjusted according to the first analog output signal. In the image acquisition mode, the amplifier is configured to amplify the sensing signal for generating a second analog output signal, and generate a fingerprint image according to the second analog output signal.

16 Claims, 4 Drawing Sheets

(56) References Cited

U.S. PATENT DOCUMENTS

2017/0330014 A1\* 11/2017 Ramberg ............. G06K 9/0002
2018/0039808 A1\* 2/2018 Lo ......................... G06F 1/3231

\* cited by examiner

CIRCUIT AND METHOD FOR SIGNAL PROCESSING IN FINGERPRINT SENSOR

CROSS-REFERENCE TO RELATED APPLICATION

This application claims the benefit of priority based upon the PCT Application Ser. No. PCT/CN2016/113375, filed on Dec. 30, 2016, entitled "Signal Processing Circuit and Method for Fingerprint Senor", which further claims the benefit of priority based on the Chinese Patent Application No. 201610099601.1, filed on Feb. 23, 2016, entitled "circuit and method for signal processing in fingerprint sensor", all of which are incorporated herein by reference in their entirety.

BACKGROUND OF THE DISCLOSURE

Field of the Disclosure

The present disclosure relates to signal processing technology, and in particularly, to a circuit and a method for signal processing in a fingerprint sensor.

Background of the Disclosure

A fingerprint sensor is used as a sensing device for generating fingerprint images, and is widely applied in access control systems, attendance management systems and mobile terminals such as mobile phones and tablet personal computers, for verifying users' identity. The fingerprint sensor may be an optical fingerprint sensor or a capacitive fingerprint sensor. The optical fingerprint sensor comprises a optical scanning element for obtaining an optical image of a fingerprint. The capacitive fingerprint sensor obtains capacitance characteristics of each partial position in an effective area of a finger, thus the fingerprint image is generated by use of capacitance variations. A circuit for signal collecting and processing of the optical fingerprint sensor is separated from the finger, so that the optical fingerprint sensor has a strong antistatic ability and a long service life, however, the optical fingerprint sensor is easy to be influenced by dust in the environment and the cleanliness of the finger. The capacitive fingerprint sensor has a compact structure and a high resolution, but has a weak antistatic ability. Therefore, the capacitive fingerprint sensor is much commonly used in mobile terminals.

Figure 1:
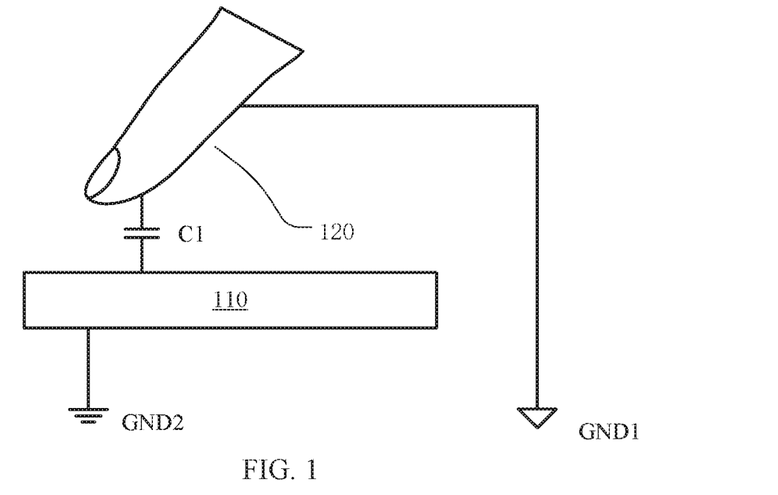
FIG. 1 shows an operating principle diagram of a capacitive fingerprint sensor.

FIG. 1 shows an operating principle diagram of a capacitive fingerprint sensor. The capacitive fingerprint senor 110 comprises an array formed by a plurality of sensing electrodes. When a finger 120 touches the capacitive fingerprint sensor 110, a first capacitor Cf is formed between the finger and the sensing electrodes. Because the first capacitor Cf formed by a fingerprint ridge of the finger 120 is different from the first capacitor Cf formed by a fingerprint valley of the finger 120, the circuit for signal processing quantifies the difference between a fingerprint ridge and a fingerprint valley by transforming the capacitance of the first capacitor Cf into an electric signal. The capacitance of a contact region is obtained by use of the plurality of sensing electrodes, then the corresponding fingerprint image can be generated.

Figure 2:
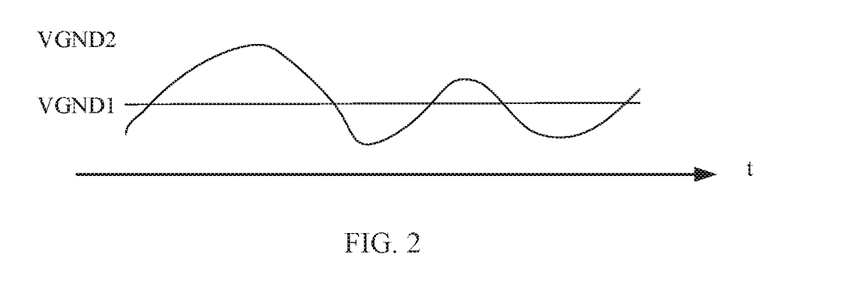
FIG. 2 shows waveform diagrams of human ground potential and reference ground potential of a fingerprint sensor.

When the finger touches the fingerprint sensor, system noise is also introduced to the circuit for signal processing, which will cause that the fingerprint image cannot be collected normally, thus identification rate may be reduced and even the fingerprint sensor cannot be operated normally. As shown in FIG. 2, when the finger touches the surface of the fingerprint sensor, human ground potential VGND1 of the finger and the reference ground potential VGND2 of the fingerprint sensor are not the same. A finger-touch action is equivalent to introducing fluctuations into the reference ground potential VGND2 of the fingerprint sensor, therefore the sensing electrodes will receive and transfer the fluctuations to the circuit for signal processing.

Thus, a circuit for signal processing in the capacitive fingerprint sensor is desired to restrain the noise introduced by the finger-touch action.

SUMMARY OF THE DISCLOSURE

In view of this, the objective of the disclosure is to provide a circuit and a method for signal processing in a fingerprint sensor, wherein a biasing circuit is introduced to adjust an operating frequency of an amplifier and the adjusted operating frequency is applied to restrain a common-mode noise introduced by the finger-touch action.

According to an aspect of the present disclosure, there is provided a circuit for signal processing in a fingerprint sensor which comprises sensing elements configured to generate a sensing signal in responsive to a finger-touch action, comprising: a biasing circuit for generating a biasing signal; an amplifier for generating an analog output signal according to the sensing signal; and an analog-to-digital converter for converting the analog output signal into a digital output signal, wherein the circuit for signal processing is configured to be operated in a noise detection mode and an image acquisition mode, in the noise detection mode, the amplifier is configured to amplify a superposed signal of the sensing signal and the biasing signal to generate a first analog output signal, and an operating frequency of the amplifier is adjusted according to the first analog output signal, in the image acquisition mode, the amplifier is configured to amplify the sensing signal to generate a second analog output signal, and generates a fingerprint image according to the second analog output signal.

Preferably, the sensing elements are sensing electrodes.

Preferably, the circuit for signal processing further comprises a first AC signal source which is coupled to the sensing electrodes and configured to provide a first AC signal as a driving signal to the sensing electrodes.

Preferably, the biasing circuit comprises a first switch, a second capacitor and a second AC signal source successively connected in series in this order between an input terminal of the amplifier and a reference ground, wherein the second AC signal source is configured to provide a second AC signal to the second capacitor, the first switch is configured to be turned on in the noise detection mode and is configured to be turned off in the image acquisition mode.

Preferably, the biasing circuit comprises a second capacitor, a first switch and a second AC signal source successively connected in series in this order between an input terminal of the amplifier and a reference ground, and a second switch connected between the reference ground and an intermediate node coupled to both of the second capacitor and the first switch, in the noise detection mode, the first switch is configured to be turned on and the second switch is configured to be turned off, and the second AC signal source is configured to provide a second AC signal to the second capacitor, in the image acquisition mode, the first switch is configured to be turned off and the second switch is configured to be turned on for making the second capacitor coupled to the reference ground through the second switch.

Preferably, the circuit for signal processing is further configured to be operated in an initialization mode, wherein in the initialization mode, the amplifier is configured to amplify the biasing signal for generating a third analog output signal and adjust the biasing circuit according to the third analog output signal to make the third analog output signal have an initial value.

Preferably, in the initialization mode, an amplitude of the second AC signal is set according to a detection on the digital output signal provided by the analog-to-digital converter when there's no finger-touch action, for making the third analog output signal have the initial value.

Preferably, the fingerprint sensor comprises a plurality of sensing elements and the amplitude of the second AC signal corresponding to each of the plurality of sensing elements is set individually.

Preferably, the third analog output signal has a first initial value for a first group of the sensing elements of the plurality of sensing elements, and has a second initial value for a second group of the sensing elements of the plurality of sensing elements.

Preferably, in the noise detection mode, the operating frequency of the amplifier is adjusted according to a detection on the digital output signal provided by the analog-to-digital converter when there is a finger-touch action, for setting the operating frequency of the amplifier in the image acquisition mode.

Preferably, the amplifier has an inverting input terminal, a non-inverting input terminal and an output terminal, the sensing elements and the biasing circuit are coupled to the inverting terminal, and the non-inverting terminal receives a reference voltage.

According to another aspect, the present disclosure further provides a method for signal processing in a fingerprint sensor comprising sensing elements configured to generate a sensing signal in responsive to a finger-touch action, comprising: amplifying a superposed signal of the sensing signal and a biasing signal to generate a first analog output signal; adjusting an operating frequency according to the first analog output signal; amplifying the sensing signal to generate a second analog output signal; and generating a fingerprint image according to the second analog output signal, wherein when the operating frequency is being adjusted, the adjusted operating frequency is chosen for restraining a common-mode noise introduced by the finger-touch action.

Preferably, the method further comprises: amplifying the biasing signal to generate a third analog output signal, and converting the third analog output signal into a digital output signal, wherein an amplitude of the superposed signal is set according to a detection on the digital output signal when there's no finger-touch action for making the third output signal have an initial value.

Preferably, the fingerprint sensor comprises a plurality of sensing elements and an amplitude of the biasing signal corresponding to each of the plurality of sensing elements is set individually.

Preferably, the third analog output has a first initial value for a first group of the sensing elements of the plurality of sensing elements, and has a second initial value for a second group of the sensing elements of the plurality of sensing elements.

Preferably, the method further comprising: converting the first analog output signal into the digital output signal, wherein during the adjusting of the operating frequency, the digital output signal is detected when there's a finger-touch action in order to set the operating frequency of the amplifier in the image acquisition mode.

The circuit for signal processing according to the embodiments of the present disclosure, uses a biasing circuit for adding up the biasing signal to the sensing signal, thus the operating frequency of the amplifier can be adjusted, therefore the value of the digital output signal obtained after the analog output generation by the circuit for signal processing and the quantification by the analog-to-digital converter fluctuates within a reasonable range. The circuit for signal processing reduces effect of the common-mode noise on the sensing signal by choosing the operating frequency of the amplifier, so that the common-mode noise introduced by the finger-touch action is restrained.

BRIEF DESCRIPTION OF THE DRAWINGS

The above and other objects, advantages and features of the present invention will become more fully understood from the detailed description given hereinbelow in connection with the appended drawings, and wherein.

DETAILED DESCRIPTION OF THE DISCLOSURE

More details according to the embodiments of present disclosure are described as follow referring to the figures. In the drawings, like reference numerals denote like members. The figures are not drawn to scale, for the sake of clarity. Moreover, some well-known parts may not be shown in figures.

Furthermore, in the following detailed description of the present disclosure, numerous specific details such as device structures, materials, dimensions, processing steps and technologies, are set forth in order to provide a thorough understanding of the present disclosure. However, it will be readily apparent to one skilled in the art that the present disclosure may be practiced without these specific details.

The present disclosure can be varied in a specific implementation of the disclosure, some of the embodiments are described as follow.

Figure 3:
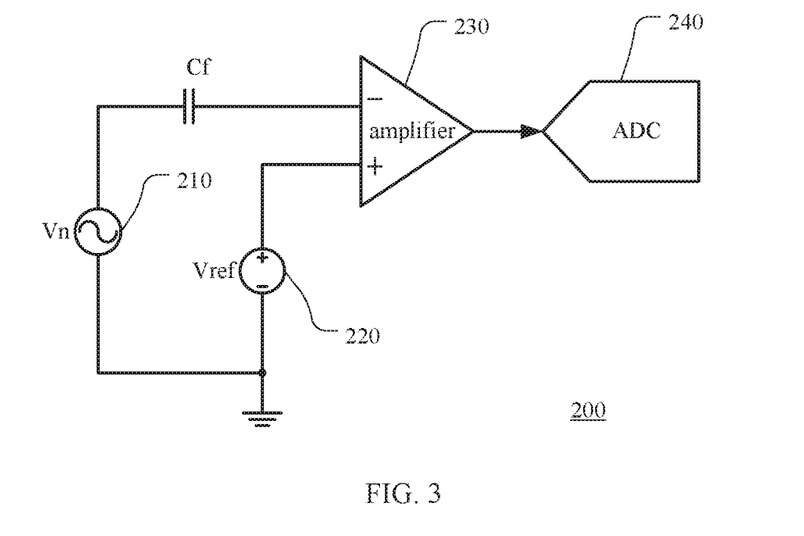
FIG. 3 shows a schematic diagram of a circuit for signal processing according to the prior art.

FIG. 3 shows a schematic diagram of a circuit for signal processing according to the prior art. The circuit 200 for signal processing comprises a first capacitor Cf corresponding to sensing elements, a first AC signal source 210, a reference voltage source 220, an amplifier 230 and an analog-to-digital converter 240. A first terminal of the first capacitor Cf is coupled to an inverting terminal of the amplifier 230, a second terminal of the first capacitor Cf is coupled to the first AC signal source 210. The reference voltage source 220 is coupled to a non-inverting terminal of the amplifier 230. An output terminal of the amplifier 230 is coupled to an input terminal of the analog-to-digital converter 240.

When a finger touches the fingerprint sensor, the first capacitor Cf is formed between the finger and sensing electrodes (the sensing elements) in the fingerprint sensor. The capacitor Cf formed by a finger ridge of the finger is different from the capacitor Cf formed by a finger valley of the finger. The sensing electrodes forming the first capacitor Cf can be implemented by a metal layer or a polycrystalline silicon layer by using integrated circuit process. The first AC signal source 210 generates an AC signal, which is, for example, one or a combination of a sine-wave signal, a square-wave signal and a triangular-wave signal. The sensing elements are driven by the first AC signal source 210. The amplifier 230 has the inverting terminal and the non-inverting terminal receiving the sensing signal and the reference voltage Vref, respectively, compares the sensing signal with the reference voltage Vref, and has the output terminal providing an amplified signal. The amplifier 230 converts a capacitance variation of the first capacitor Cf into the sensing signal, in order to quantify a difference between the finger ridge and the finger valley. The analog-to-digital converter 240 converts the amplified signal into a digital signal.

When the finger touches the fingerprint sensor, not only the first capacitor Cf is changed as the description above, but also system noise is introduced. The finger touching the surface of the fingerprint sensor is equivalent to a noise source connected to a detecting circuit through the first capacitor Cf, thus output signals generated by post-stage processing circuits and the detecting circuit are influenced.

The system noise may fall into two types, which are differential-mode noise and common-mode noise. The differential-mode noise may be restrained by methods such as increasing the power supply rejection ratio of the system. The common-mode noise is the common noise simultaneously exists on both of the power supply and the reference ground potential of the system. This type of noise affects system performance more seriously when human ground potential is not the same as the reference ground potential of the system. The common-mode noise is generally a narrow-bandwidth signal with a certain spectral characteristic. Because the common-mode noise is introduced into the system by a finger-touch action, the common-mode noise cannot be distinguished from the sensing signal which is normally received.

The fingerprint sensor can restrain the noise with a certain amplitude and a certain frequency by use of methods such as digital/analog filtering, however, when there's noise or an interference signal with a high amplitude or a specific frequency beyond the processing ability of the fingerprint sensor, the fingerprint sensor will not be able to collect the correct fingerprint images.

Figure 4:
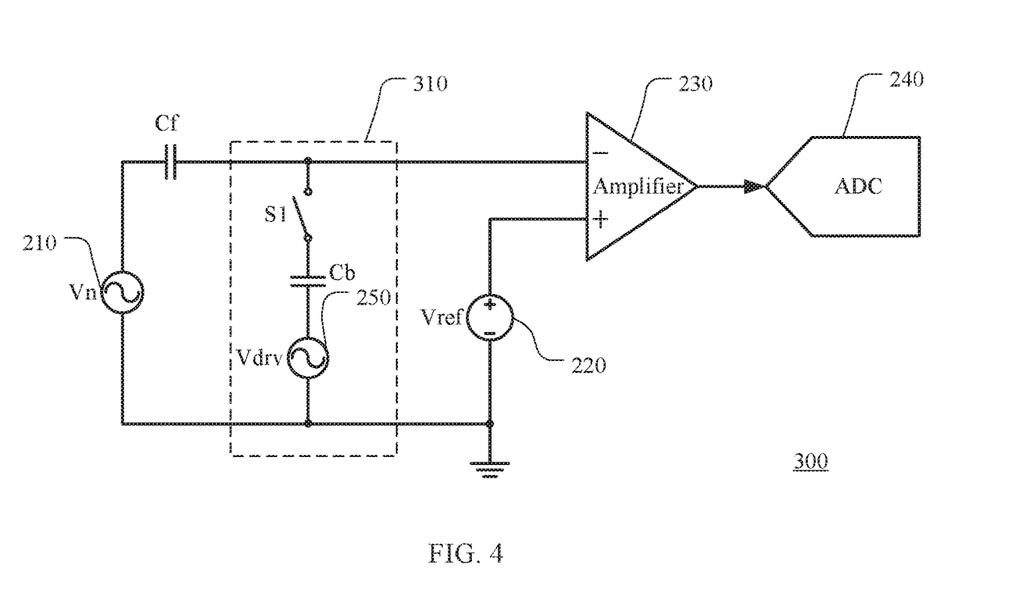
FIG. 4 shows a schematic diagram of a circuit for signal processing according to a first embodiment of the present disclosure.

FIG. 4 shows a schematic diagram of a circuit for signal processing according to a first embodiment of the present disclosure. The circuit 300 for signal processing comprises a first capacitor Cf corresponding to sensing elements, a first AC signal source 210, a reference voltage source 220, an amplifier 230 and an analog-to-digital converter 240. A first terminal of the first capacitor Cf is coupled to an inverting terminal of the amplifier 230, a second terminal of the first capacitor Cf is coupled to the first AC signal source 210. The reference voltage source 220 is coupled to a non-inverting terminal of the amplifier 230. An output terminal of the amplifier 230 is coupled to an input terminal of the analog-to-digital converter 240.

Different from the circuit 200 for signal processing according to the prior art shown in FIG. 3, the circuit 300 according to the embodiment of the present disclosure further comprises a biasing circuit 310. The biasing circuit 310 comprises a first switch S1, a second capacitor Cb and a second AC signal source 250 successively connected in series between the inverting input terminal of the amplifier 230 and the reference ground.

The second AC signal source 250 generates an AC signal Vdrv, which is, for example, one or a combination of a sine-wave signal, a square-wave signal and a triangular-wave signal. In the embodiment, the second AC signal source 250 generates the AC signal Vdrv with a predetermined amplitude, a capacitance of the second capacitor Cb is predetermined, so that quantity of electric charges on the second capacitor Cb is predetermined and taken as a biasing signal.

When the finger touches the fingerprint sensor, the first capacitor Cf is formed between the finger and sensing electrodes of the fingerprint sensor. The amplifier 230 converts a capacitance variation of the first capacitor Cf into the sensing signal, in order to quantify a difference between the finger ridge and the finger valley.

The circuit 300 for signal processing can be operated in a noise detection mode and an image acquisition mode.

In the noise detection mode, the first switch S1 is turned on, so that the amplifier 230 amplifies a superposed signal of the sensing signal and the biasing signal to generate a first analog output signal, and adjusts an operating frequency of the amplifier 230 according to the first analog output signal.

In the image acquisition mode, the first switch S1 is turned off, so that the amplifier 230 amplifies the sensing signal to generate a second analog output signal, and generates a fingerprint image according to the second analog output signal.

In the embodiment, the biasing circuit 310 is used to adjust the operating frequency of the amplifier 230 in the noise detection mode, so as to restrain noise effect on the fingerprint image in the image acquisition mode.

In the embodiment, the amplifier 230 is used as a charge-transferring amplifier operated in discrete-time domain, and is used to obtain the sensing signal. In some alternative embodiments, various signal processing circuits operated in continuous-time domain can also be used to obtain the sensing signal.

In some preferred embodiments, the circuit 300 for signal processing can also be operated in an initialization mode. In the initialization mode, the amplifier 230 amplifies the biasing signal to generate a third analog output signal, and adjusts the biasing circuit 310 according to the third analog output signal to make the third analog output signal have an initial value.

For example, In the initialization mode, the first switch S1 is turned on, the amplitude of the AC signal Vdrv can be set according to the detection on the digital output value provided by the analog-to-digital converter when there's no finger-touch action, so as to make the third analog output signal have the initial value.

Figure 5:
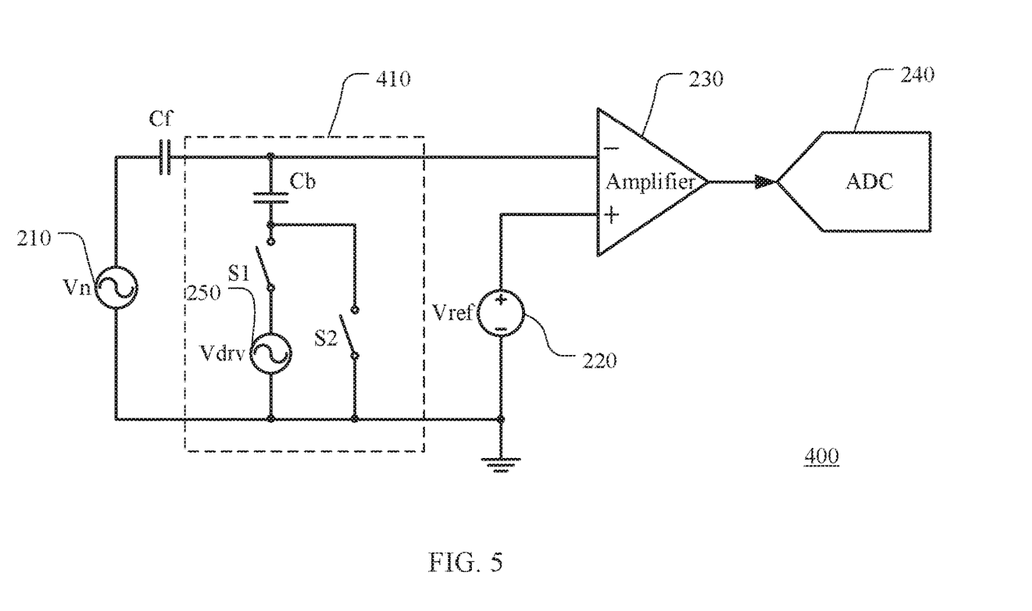
FIG. 5 shows a schematic diagram of a circuit for signal processing according to a second embodiment of the present disclosure.

FIG. 5 shows a schematic diagram of a circuit for signal processing according to a second embodiment of the present disclosure. The circuit 400 for signal processing comprises a first capacitor Cf corresponding to sensing elements, a first AC signal source 210, a reference voltage source 220, an amplifier 230 and an analog-to-digital converter 240. A first terminal of the first capacitor Cf is coupled to an inverting terminal of the amplifier 230, a second terminal of the first capacitor Cf is coupled to the first AC signal source 210. The reference voltage source 220 is coupled to a non-inverting terminal of the amplifier 230. An output terminal of the amplifier 230 is coupled to an input terminal of the analog-to-digital converter 240.

Different from the circuit 300 for signal processing according to the first embodiment of the present disclosure shown in FIG. 4, the circuit 400 for signal processing according to the second embodiment of present disclosure comprises a biasing circuit 410. The biasing circuit 410 comprises a second capacitor Cb, a first switch S1 and a second AC signal source 250 successively connected in series between the inverting input terminal of the amplifier 230 and the reference ground, and a second switch S2 connected between the reference ground and an intermediate node coupled to both of the second capacitor Cb and the first switch S1.

The circuit 400 for signal processing can be operated in a noise detection mode and an image acquisition mode.

In the noise detection mode, the first switch S1 is turned on and the second switch S2 is turned off, the second capacitor Cb is coupled with the second AC signal source 250 through the first switch S1, so that the amplifier 230 amplifies a superposed signal of the sensing signal and the biasing signal to generate a first analog output signal, and adjusts an operating frequency 230 of the amplifier 230 according to the first analog output signal.

In the image acquisition mode, the first switch S1 is turned off and the second switch S2 is turned on, the second capacitor Cb is coupled to the reference ground through the second switch S2, so that the amplifier 230 amplifies the sensing signal to generate a second analog output signal, and generates a fingerprint image according to the second analog output signal. Because the quantity of electric charges on the second capacitor Cb keeps constant, the fingerprint image will not be influenced when the fingerprint image is being collected.

In the embodiment, the biasing circuit 410 is used to adjust the operating frequency of the amplifier in the noise detection mode, so as to restrain noise effect on the fingerprint image in the image acquisition mode.

In some preferred embodiments, the circuit 400 for signal processing can be further operated under an initialization mode, wherein under the initialization mode, the amplifier 230 amplifies the biasing signal to generate a third analog output signal and adjusts the biasing circuit 410 according to the third analog output signal to make the third analog output signal have an initial value.

For example, in the initialization mode, the first switch S1 is turned on and the second switch S2 is turned off, the amplitude of the AC signal Vdrv can be set according to the detection on the digital output value provided by the analog-to-digital converter when there's no finger-touch action, thus making the third analog output signal have the initial value.

Figure 6:
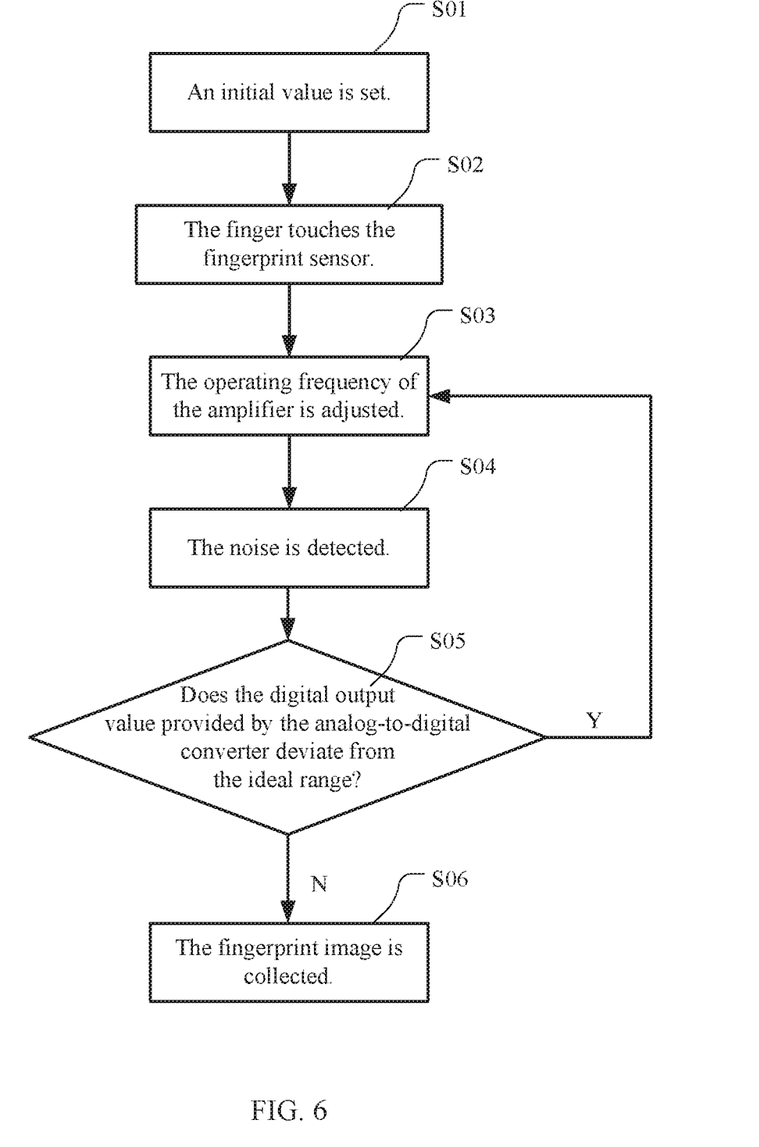
FIG. 6 shows a flow diagram of a method for signal processing according to a third embodiment of the present disclosure.

FIG. 6 shows a flow diagram of a method for signal processing according to a third embodiment of the present disclosure. The circuit 300 for signal processing shown in FIG. 4 is taken as an example to describe each processing step of the method.

In step S01, an initial value is set. In this step, because the finger doesn't touch the fingerprint sensor, the first capacitor Cf is disconnected to the amplifier 230. The first switch S1 is turned on, so that the biasing circuit 310 can provide the biasing signal to the inverting input terminal of the amplifier 230.

In this step, by setting parameters of components comprised in the biasing circuit 310, wherein the parameters are, for example, the capacitance of the second capacitor Cb and the amplitude of the AC signal Vdrv provided by the second AC signal source 250, the voltage of the amplified signal provided by the amplifier 230 is predetermined, which makes the digital output value provided by the analog-to-digital converter 240 is approximately half of a full-scale digital value. An 8-bit analog-to-digital converter is taken as an example, the code range of the digital output value is (0-255). In the step S01, in the condition that only the second capacitor Cb is coupled to the inverting input terminal of the amplifier 230, the digital output value provided by the analog-to-digital converter is around 128. Because the digital output value depends on a ratio between the integrated circuit components comprised in the fingerprint sensor and is based on integrated circuit fabrication process, the digital output value can be controlled to fluctuate within a relatively precise range.

In step S02, the finger touches the fingerprint sensor, the first capacitor Cf is coupled to the amplifier 230, the signal provided to the inverting input terminal of the amplifier 230 is the superposed signal of the sensing signal provided by the first capacitor Cf and the biasing signal provided by the biasing circuit 310, and is described by equation (1):

$$V_{out}=A*(Cf*Vn+Cb*Vdrv)|_{f=f0} \quad (1)$$

Wherein, Vout represents the analog output voltage provided by the amplifier, A represents an amplification factor of the amplifier, Cf and Cb respectively represent the capacitances of the first capacitor and the second capacitor, Vn and Vdrv respectively represent the amplitudes of AC signals provided by the first AC signal source and the second AC signal source, f represents the operating frequency of the amplifier, f0 represents the frequency of the AC signal provided by the second AC signal source.

The circuit for signal processing may be operated in continuous-time mode, or may be a switch-capacitance circuit operated in discrete-time mode. Generally, the operating frequency of the signal Vdrv and the operating frequency of the detection circuit are the same or have a strong correlation with each other, such as one of the two frequencies is an integer multiple of the other.

In step S03 to S05, the operating frequency of the amplifier is adjusted based on the noise detection, in order to restrain and even eliminate the effect of the common-mode noise. In the embodiment shown in FIG. 4, the operating frequency is, for example, the operating frequency of the amplifier 230.

When the frequency of the common-mode noise and the above-described operating frequency are the same with each other or one of the two frequencies is an integer multiple of the other, the noise will directly affect the detection result, so that the digital output value obtained after the quantification process implemented by the analog-to-digital converter will deviate from an ideal range. Furthermore, an overlarge common-mode noise will cause the saturation of the amplifier 230 and the analog-to-digital converter 240, so that time to re-setup operating status of the circuit will be increased, which will affect the subsequent detection result.

When frequency and harmonic frequency of the common-mode noise is much different from the operating frequency, noise effect on the detection result is reduced. Besides, effect of a weak noise may also be eliminated by methods such as digital filtering.

The above-described process on adjusting the operating frequency comprises: setting an operating frequency in the step S03, detecting the digital output value provided by the analog-to-digital converter 240 in the step S04, and making a judgement whether the digital output value provided by the analog-to-digital converter 240 deviates from the ideal range in the step S05.

If the digital output value provided by the analog-to-digital converter 240 deviates from the ideal range, or even causes the saturation of at least one of the amplifier 230 and the analog-to-digital converter 240, then the operating frequency will be reset to a different frequency, and the step S03 to S05 will be repeated.

On the contrary, if the digital output value provided by the analog-to-digital converter 240 is within the ideal range, which indicates that the effect of the common-mode noise can be restrained or even eliminated by the current operating frequency, so that the current operating frequency can be used as the operating frequency in the image acquisition mode.

Energy of the common-mode noise is generally concentrated in a relatively narrow bandwidth with a specific center frequency, so that the system determines the frequency, which introduces a relatively weak common-mode noise and is used as the operating frequency of the circuit to reduce or even eliminate the effect of the common-mode noise, by a frequency searching method according to the above-described noise detection method.

Therefore, the circuit for signal processing provided by the present disclosure can determine whether there is any interference affecting the image quality under the present frequency setting by detecting the digital output value provided by the analog-to-digital converter 240. Moreover, by detecting the digital output value provided by the analog-to-digital converter, the operating frequency of the amplifier is adjusted to make the operating frequency in the image acquisition mode ideal.

In the method for signal processing, the biasing circuit is used to adjust the operating frequency of the amplifier 230, and the adjusted operating frequency is used to collect the fingerprint image, so that the common-mode noise introduced by the finger-touch action is restrained.

In the embodiment, the fingerprint sensor may comprises a plurality of sensing elements and the amplitudes of the AC signals Vdrv for the plurality of sensing elements, can be set to a same value. In some alternative embodiments, for each of the plurality of sensing elements in the fingerprint sensor, the amplitude of the AC signal Vdrv can be set individually for a better detection.

Figure 7:
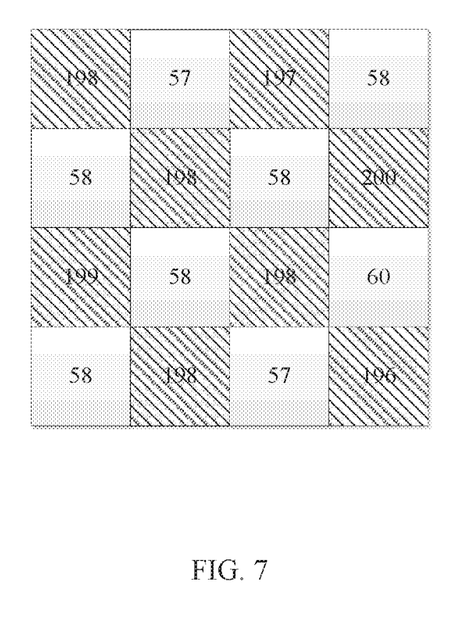
FIG. 7 shows a distribution diagram of an initializing signal of a plurality of sensing elements in a method of signal processing according to an embodiment of the present disclosure.

For example, in the above-described step S01, the AC signals Vdrv of all of the detection circuits for the plurality of sensing elements in the fingerprint sensor can have two amplitudes, which makes the digital output values corresponding to the plurality of sensing elements become two digital values accordingly. FIG. 7 shows a distribution diagram of an initializing signal of a plurality of sensing elements in a method of signal processing according to an embodiment of the present disclosure. An 8-bit analog-to-digital converter is taken as an example, the average value of the digital output values of the plurality of sensing elements is around 128. The plurality of sensing elements are arranged in an array, and can be separated into a first group of sensing elements and a second group of sensing elements, both of which are distributed in checkerboard pattern. Due to different amplitudes of the AC signals Vdrv, the average value of the digital output values of the first group of sensing elements is 198, and the average value of the digital output values of the second group of sensing elements is 58. Based on the above-described stimulation method, by making statistics on the average value of the digital output values of the plurality of sensing elements in the fingerprint sensor, and/or the average values of the digital output values of the first group of sensing elements and the second group of sensing elements, a reasonable initial value is set for determining noise intensity.

In the above-described embodiments, in order to save time for adjusting the operating frequency, after the finger touches the fingerprint sensor and before the fingerprint image is collected, the process of adjusting the operating frequency of the amplifier is implemented.

For the fingerprint sensor in a planar-array form, a partial region (the central region) of the fingerprint sensor can be selected, and the operating frequency of the amplifier is adjusted by detecting the digital output values provided the analog-to-digital converter. Because only a part of the plurality of sensing elements in the fingerprint sensor are driven and detected, the time to adjust the operating frequency is saved.

Preferably, for further saving the noise detection time of the fingerprint sensor, the system can divide the noise detection region of the fingerprint sensor into N sub regions. The detection circuit in each sub region provides an AC signal Vn with a different frequency to one terminal of the first capacitor Cf. Therefore, during one single detecting process, noise conditions under N different frequencies can be detected. By detecting the digital output values provided by the analog-to-digital converters in the sub regions, an ideal operating frequency for the circuit for signal processing can be determined.

It should also be understood that the relational terms such as "first", "second", and the like are used in the context merely for distinguishing one element or operation form the other element or operation, instead of meaning or implying any real relationship or order of these elements or operations. Moreover, the terms "comprise", "comprising" and the like are used to refer to comprise in nonexclusive sense, so that any process, approach, article or apparatus relevant to an element, if follows the terms, means that not only said element listed here, but also those elements not listed explicitly, or those elements inherently included by the process, approach, article or apparatus relevant to said element. If there is no explicit limitation, the wording "comprise a/an . . . " does not exclude the fact that other elements can also be included together with the process, approach, article or apparatus relevant to the element.

Although various embodiments of the present invention are described above, these embodiments neither present all details, nor imply that the present invention is limited to these embodiments. Obviously, many modifications and changes may be made in light of the teaching of the above embodiments. These embodiments are presented and some details are described herein only for explaining the principle of the invention and its actual use, so that one skilled person can practice the present invention and introduce some modifications in light of the invention. Accordingly, the protection scope of the present disclosure should be defined by attached claims.

The invention claimed is:

1. A circuit for signal processing in a fingerprint sensor which comprises sensing elements configured to generate a sensing signal in responsive to a finger-touch action, comprising:
 a biasing circuit for generating a biasing signal;
 an amplifier for generating an analog output signal according to the sensing signal; and an analog-to-digital converter for converting the analog output signal into a digital output signal,
wherein the circuit for signal processing is configured to be operated in a noise detection mode and an image acquisition mode,
in the noise detection mode, the amplifier is configured to amplify a superposed signal of the sensing signal and the biasing signal to generate a first analog output signal, and an operating frequency of the amplifier is adjusted according to the first analog output signal,
in the image acquisition mode, the amplifier is configured to amplify the sensing signal to generate a second analog output signal, and generate a fingerprint image according to the second analog output signal.

2. The circuit according to claim 1, wherein the sensing elements are sensing electrodes.

3. The circuit according to claim 2, further comprising a first AC signal source which is coupled to the sensing electrodes and configured to provide a first AC signal as a driving signal to the sensing electrodes.

4. The circuit according to claim 3, wherein the biasing circuit comprises a first switch, a second capacitor and a second AC signal source successively connected in series in this order between an input terminal of the amplifier and a reference ground, wherein the second AC signal source is configured to provide a second AC signal to the second capacitor,
the first switch is configured to be turned on in the noise detection mode,
the first switch is configured to be turned off in the image acquisition mode.

5. The circuit according to claim 3, wherein the biasing circuit comprises a second capacitor, a first switch and a second AC signal source successively connected in series in this order between an input terminal of the amplifier and a reference ground, and a second switch connected between the reference ground and an intermediate node coupled to both of the second capacitor and the first switch,
in the noise detection mode, the first switch is configured to be turned on and the second switch is configured to be turned off, the second AC signal source is configured to provide a second AC signal to the second capacitor,
in the image acquisition mode, the first switch is configured to be turned off and the second switch is configured to be turned on for making the second capacitor coupled to the reference ground through the second switch.

6. The circuit according to claim 4, wherein the circuit is further configured to be operated in an initialization mode, and in the initialization mode, the amplifier is configured to amplify the biasing signal for generating a third analog output signal and adjust the biasing circuit according to the third analog output signal to make the third analog output signal have an initial value.

7. The circuit according to claim 6, wherein in the initialization mode, an amplitude of the second AC signal is set according to a detection on the digital output signal provided by the analog-to-digital converter when there's no finger-touch action, for making the third analog output signal have the initial value.

8. The circuit according to claim 7, wherein the fingerprint sensor comprises a plurality of sensing elements and the amplitude of the second AC signal corresponding to each of the plurality of sensing elements is set individually.

9. The circuit according to claim 8, wherein for a first group of the sensing elements of the plurality of sensing elements and a second group of the sensing elements of the plurality of sensing elements, the third analog output signal has a first initial value and a second initial value, respectively.

10. The circuit according to claim 6, wherein in the noise detection mode, the operating frequency of the amplifier is adjusted according to a detection on the digital output signal provided by the analog-to-digital converter when there is a finger-touch action, for setting the operating frequency of the amplifier in image acquisition mode.

11. The circuit according to claim 1, wherein the amplifier has an inverting input terminal, a non-inverting input terminal and an output terminal, the sensing elements and the biasing circuit are coupled to the inverting terminal, and the non-inverting terminal receives a reference voltage.

12. A method for signal processing in a fingerprint sensor which comprises sensing elements configured to generate a sensing signal in responsive to a finger-touch action, comprising:
amplifying a superposed signal of the sensing signal and a biasing signal to generate a first analog output signal;
adjusting an operating frequency according to the first analog output signal;
amplifying the sensing signal to generate a second analog output signal; and
generating a fingerprint image according to the second analog output signal, wherein
when the operating frequency is being adjusted, the adjusted operating frequency is chosen for restraining a common-mode noise introduced by the finger-touch action.

13. The method according to claim 12, further comprising: amplifying the biasing signal to generate a third analog output signal, and converting the third analog output signal into a digital output signal, wherein an amplitude of the superposed signal is set according to a detection on the digital output signal when there's no finger-touch action for making the third output signal have an initial value.

14. The method according to claim 13, wherein the fingerprint sensor comprises a plurality of sensing elements, an amplitude of the biasing signal is individually set for each of the plurality of sensing elements.

15. The method according to claim 14, wherein the third analog output signal has a first initial value for a first group of the sensing elements of the plurality of sensing elements, and the third analog output signal has a second initial value for a second group of the sensing elements of the plurality of sensing elements.

16. The method according to claim 12, further comprising: converting the first analog output signal into the digital output signal, wherein during the adjusting of the operating frequency, the digital output signal is detected when there's a finger-touch action in order to set the operating frequency in the image acquisition mode.

* * * * *